United States Patent
Tang

(10) Patent No.: US 8,254,222 B1
(45) Date of Patent: Aug. 28, 2012

(54) DISK DRIVE TUNING DUAL STAGE ACTUATOR SERVO LOOP GAINS FROM OPEN LOOP RESPONSE AT TARGET FREQUENCY

(75) Inventor: Shan Tang, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/052,353

(22) Filed: Mar. 21, 2011

(51) Int. Cl.
*G11B 7/00* (2006.01)
*G11B 5/596* (2006.01)

(52) U.S. Cl. .................... 369/44.29; 360/78.05

(58) Field of Classification Search ............... 369/44.29, 369/44.35; 360/78.05, 78.09, 78.12, 69
See application file for complete search history.

(56) References Cited

U.S. PATENT DOCUMENTS

| | | | |
|---|---|---|---|
| 6,088,187 A | 7/2000 | Takaishi | |
| 6,263,251 B1 * | 7/2001 | Rutschmann | 369/44.36 |
| 6,546,296 B1 * | 4/2003 | Hara | 360/69 |
| 6,975,477 B1 | 12/2005 | Hu et al. | |
| 7,136,257 B2 * | 11/2006 | Zhang et al. | 360/78.05 |
| 7,265,936 B1 | 9/2007 | Lee et al. | |
| 7,342,740 B1 | 3/2008 | Lee et al. | |
| 7,385,780 B2 | 6/2008 | Kim et al. | |
| 7,474,496 B1 | 1/2009 | Sun et al. | |
| 7,869,157 B2 | 1/2011 | Nagashima et al. | |
| 2001/0036034 A1 * | 11/2001 | Chang et al. | 360/78.05 |
| 2002/0176201 A1 * | 11/2002 | Hsin et al. | 360/78.05 |
| 2007/0223136 A1 | 9/2007 | Hutsell | |

* cited by examiner

*Primary Examiner* — Thang Tran

(57) ABSTRACT

A disk drive is disclosed comprising a disk surface, a head coupled to a distal end of an actuator arm, and a dual stage actuator (DSA) servo loop comprising a voice coil motor (VCM) servo loop and a microactuator servo loop operable to actuate the head over the disk surface. The microactuator servo loop is disabled, and after disabling the microactuator servo loop a sinusoid is injected into the VCM servo loop, wherein the sinusoid comprises a target frequency. A first open loop response of the VCM servo loop is computed. The microactuator servo loop is enabled, and after enabling the microactuator servo loop the sinusoid is injected into the DSA servo loop. A second open loop response of the DSA servo loop is computed. A microactuator servo loop gain and a VCM servo loop gain are tuned in response to the first and second open loop responses.

18 Claims, 5 Drawing Sheets

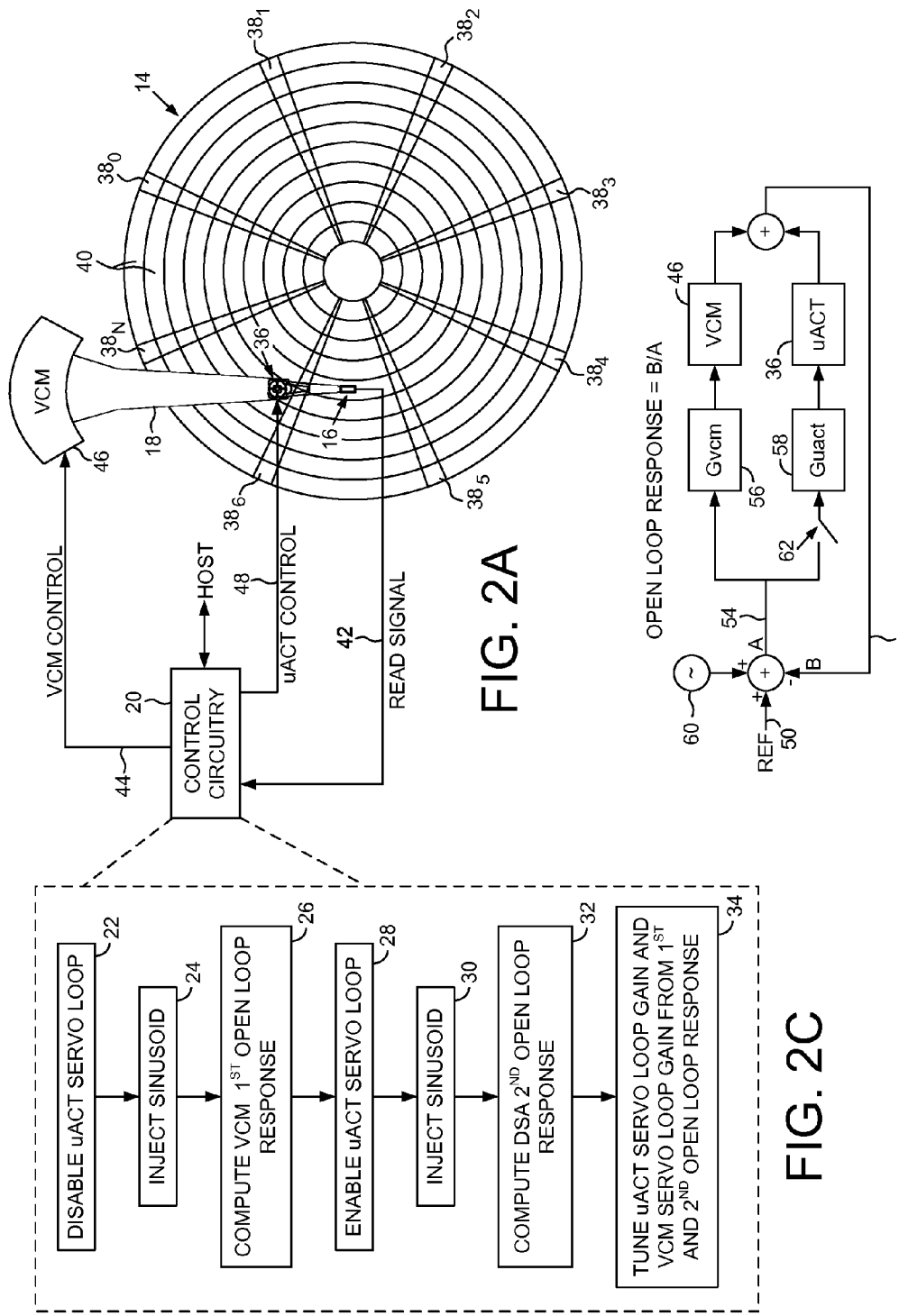

DSA_OPEN_LOOP = (1 + k2·Gc2·G'uact)·k1·Gc1·Gvcm + k2·Gc2·Guact
= k1·k2·Gc1·Gvcm·Gc2·G'uact + k1·Gc1·Gvcm + k2·Gc2·Guact VCM_OPEN_LOOP = Gc1·Gvcm; k1=k2=1; uACT Disabled DSA_OPEN_LOOP = (Gc1·Gvcm)·Gc2·G'uact + Gc1·Gvcm + Gc2·Guact; k1=k2=1; uACT Enabled TARGET_DSA_OPEN_LOOP = k1·k2·Gc1·Gvcm·Gc2·G'uact + k1·Gc1·Gvcm + k2·Gc2·Guact

DISK DRIVE TUNING DUAL STAGE ACTUATOR SERVO LOOP GAINS FROM OPEN LOOP RESPONSE AT TARGET FREQUENCY

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 1 as comprising a number of servo tracks 3 defined by servo sectors $5_0$-$5_N$ recorded around the circumference of each servo track. Each servo sector 5, comprises a preamble 7 for storing a periodic pattern, which allows proper gain adjustment and timing synchronization of the read signal, and a sync mark 9 for storing a special pattern used to symbol synchronize to a servo data field 11. The servo data field 11 stores coarse head positioning information, such as a servo track address, used to position the head over a target data track during a seek operation. Each servo sector 5, further comprises groups of servo bursts 13, which are recorded with precise intervals and offsets relative to the track centerlines. The servo bursts 13 provide fine head position information used for centerline tracking while accessing a data track during write/read operations.

As the density of the data tracks increases, a microactuator may be employed in combination with the VCM to improve the tracking performance of the servo system. Any suitable microactuator may be employed such as a suitable piezoelectric (PZT) actuator. It may be desirable to calibrate a gain of the servo compensators for both the VCM and microactuator servo loops. This is typically performed in the prior art by first calibrating a gain for the VCM servo loop and then calibrating a gain for the microactuator servo loop. However, calibrating the VCM and microactuator servo loop gains independently may lead to suboptimal performance.

BRIEF DESCRIPTION OF THE DRAWINGS

FIG. 2A shows a disk drive according to an embodiment of the present invention comprising a head actuated over a disk by a dual stage actuator (DSA) comprising a VCM and a microactuator.

FIG. 2B shows components of a DSA servo loop according to an embodiment of the present invention.

FIG. 2C is a flow diagram according to an embodiment of the present invention for computing a microactuator servo loop gain and a VCM servo loop gain in response to open loop responses at a target frequency.

DETAILED DESCRIPTION OF EMBODIMENTS OF THE INVENTION

Figure 1:
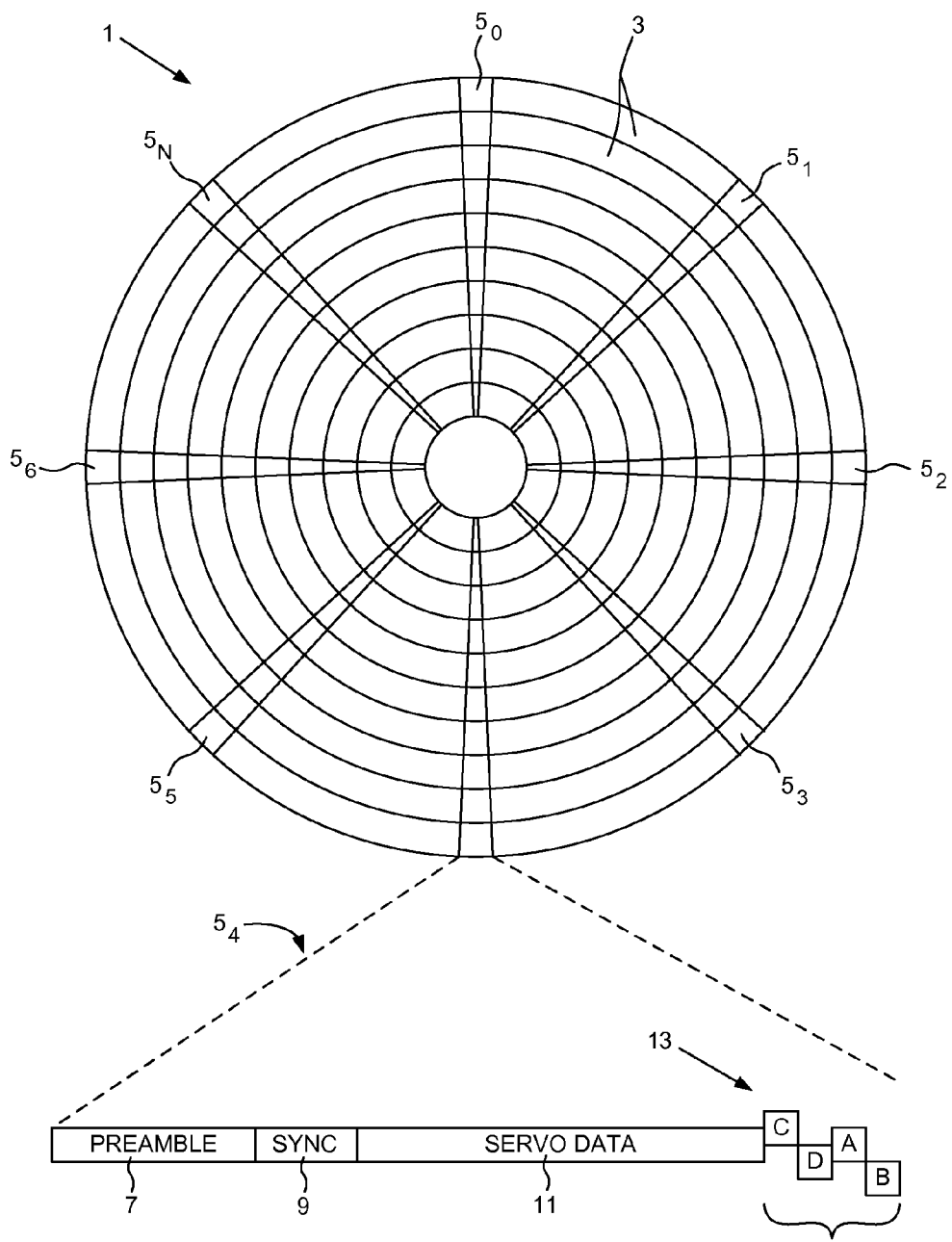
FIG. 1 shows a prior art disk format comprising a plurality of servo tracks defined by embedded servo sectors.

FIG. 2A shows a disk drive according to an embodiment of the present invention comprising a disk surface 14, a head 16 coupled to a distal end of an actuator arm 18, and a dual stage actuator (DSA) servo loop comprising a voice coil motor (VCM) servo loop and a microactuator servo loop (FIG. 2B) operable to actuate the head 16 over the disk surface 14. The disk drive further comprises control circuitry 20 operable to execute the flow diagram of FIG. 2C, wherein the microactuator servo loop is disabled (step 22), and after disabling the microactuator servo loop a sinusoid is injected into the VCM servo loop (step 24), wherein the sinusoid comprises a target frequency. A first open loop response of the VCM servo loop is computed (step 26). The microactuator servo loop is enabled (step 28), and after enabling the microactuator servo loop the sinusoid is injected into the DSA servo loop (step 30). A second open loop response of the DSA servo loop is computed (step 32). A microactuator servo loop gain and a VCM servo loop gain are tuned in response to the first and second open loop responses (step 34).

In the embodiment of FIG. 2A, a suitable microactuator 36 couples the head 16 to a distal end of the actuator arm 18 through a load beam. The microactuator 36 rotates the load beam about a pivot in order to actuate the head 16 over the disk surface 14 in fine movements. Any suitable microactuator 36 may be employed in the embodiments of the present invention, such as a suitable piezoelectric actuator which deforms in response to a suitable control signal (voltage or current). In addition, the microactuator may be coupled to the head at any suitable location, for example, through a gimbal assembly that couples the head to the load beam.

Also in the embodiment of FIG. 2A, the disk surface 14 comprises embedded servo sectors $38_0$-$38_N$ that define a plurality of servo tracks 40. The control circuitry 20 processes a read signal 42 emanating from the head 16 to demodulate the servo sectors $38_0$-$38_N$ and generate a position error signal (PES) representing an error between the actual position of the head and a target position relative to a target track. The control circuitry 20 filters the PES using suitable compensation filters to generate a first control signal 44 applied to a voice coil motor (VCM) 46 which rotates the actuator arm 18 about a pivot, and a second control signal 48 applied to the microactuator 26 in order to rotate the load beam about a pivot, thereby actuating the head 16 radially over the disk surface 14 in a direction that reduces the PES.

FIG. 2B shows a DSA servo loop according to an embodiment of the present invention comprising a reference signal 50 representing a target position of the head 16, and an estimated position 52 of the head 16 which is subtracted from the reference signal 50 to generate the PES 54. A first compensator 56 filters the PES to generate the control signal applied to the VCM 46, and a second compensator 58 filters the PES to generate the control signal applied to the microactuator 36. The VCM servo loop comprises the first compensator 56 and VCM 46, and the microactuator servo loop comprises the second compensator 58 and the microactuator 36. When calibrating the microactuator servo loop gain and the VCM servo loop gain, a sinusoid 60 at a target frequency is added to the PES 54 (steps 24 and 30 of FIG. 2C). In FIG. 2C, the microactuator servo loop is disabled (step 22 of FIG. 2C) conceptually by opening switch 62, although any suitable technique may be employed to disable the microactuator servo loop.

In the embodiment of FIG. 2B, the open loop response is computed (steps 26 and 32 of FIG. 2C) by computing the frequency response (real and imaginary parts corresponding to a magnitude and phase) at points A and B at the frequency of the injected sinusoid 60, and then dividing the frequency response at point B by the frequency response at point A. Any suitable technique may be employed to compute the frequency response at points A and B, such as computing a Fast Fourier Transform (FFT) at the frequency of the injected sinusoid 60.

Figures 3A, 3B, 3C, 3D:
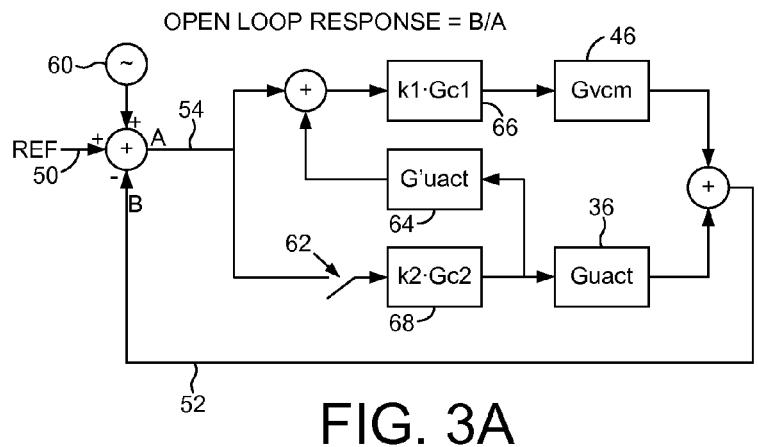
FIG. 3A shows components of a DSA servo loop according to another embodiment of the present invention.
FIG. 3B shows an equation representing the open loop response of the DSA servo loop according to an embodiment of the present invention.
FIG. 3C shows how a first parameter of the equation in FIG. 3B is determined by disabling the microactuator servo loop, and then how a second parameter of the equation in FIG. 3B is determined after enabling the microactuator servo loop.
FIG. 3D shows an embodiment of the present invention wherein scalars are computed based on a target DSA open loop response at a target frequency.

FIG. 3A shows an embodiment of the present invention wherein the DSA servo loop comprises a microactuator estimator G'uact 64 for adjusting the PES 54 based on the expected affect of the control signal applied to the microactuator 36. For example, the output of the microactuator estimator G'uact 64 may be subtracted from the PES 54 in order to cancel the effect of the microactuator 36 on the PES 54, and thereby cancel the effect of the microactuator 36 on the VCM servo loop. In one embodiment, the microactuator estimator G'uact 64 may comprise a nominal transfer function established for a family of disk drives based on known or measured design parameters of a nominal DSA servo loop. In another embodiment, the transfer function for the microactuator estimator G'uact 64 may be determined (or tuned) for each individual disk drive by executing any suitable calibration procedure, and in yet another embodiment, the transfer function may be adapted over time during normal operation of the disk drive.

Also in the embodiment of FIG. 3A, a VCM compensator 66 comprises a nominal transfer function Gc1 determine for the VCM servo loop based on known or measured design parameters of a nominal DSA servo loop, and a microactuator compensator 68 comprises a nominal transfer function Gc2 determined for microactuator servo loop based on known or measured design parameters of a nominal DSA servo loop. Using the calibration procedure in the embodiments of the present invention, the VCM servo loop gain is tuned by adjusting a scalar k1, and the microactuator servo loop gain is tuned by adjusting a scalar k2.

Figure 3E:
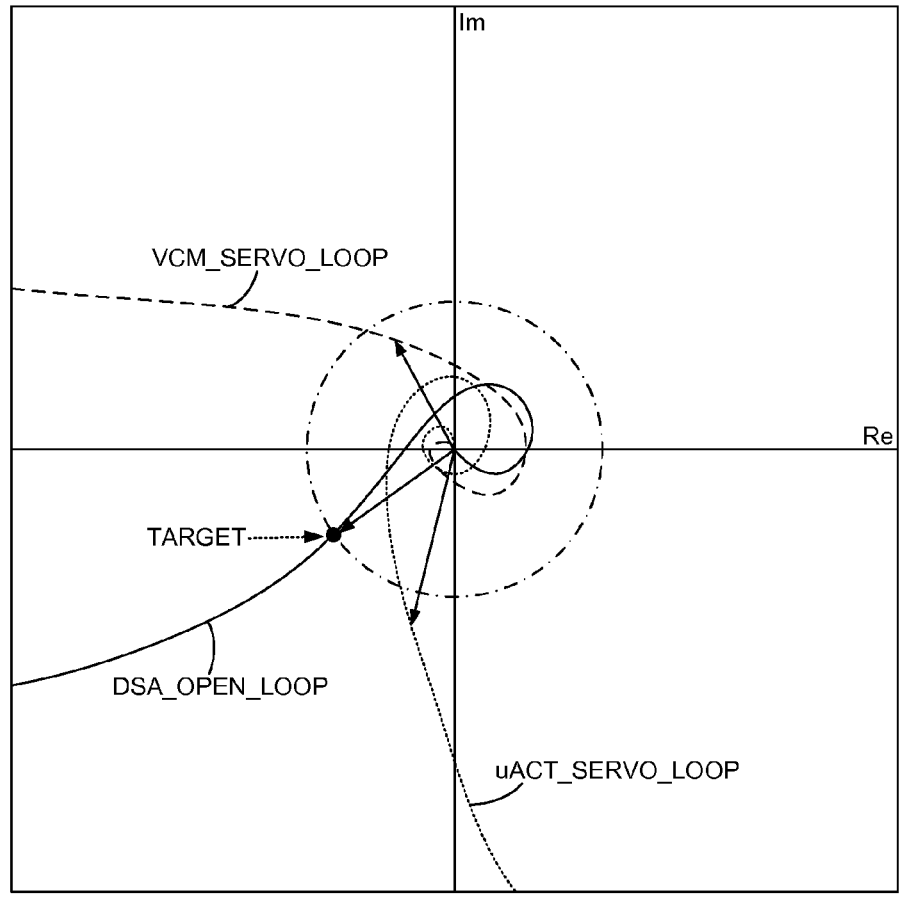
FIG. 3E shows a Nyquist plot illustrating a target DSA open loop response at a nominal bandwidth frequency of the DSA servo loop according to an embodiment of the present invention.

FIG. 3B shows an equation representing the open loop response of the DSA servo loop as comprising a complex component due to the VCM servo loop added to a complex component due to the microactuator servo loop. Accordingly, as illustrated in FIG. 3E, the open loop response of the DSA servo loop can be represented using a Nyquist plot as the combination of the open loop response of the VCM servo loop and the microactuator servo loop for all frequencies. In one embodiment, a nominal target open loop response for the DSA servo loop is determined at a target frequency. In the embodiment shown in FIG. 3E, the target frequency substantially matches a nominal bandwidth frequency of the DSA servo loop based on known or measured design parameters of a nominal DSA servo loop. As shown in FIG. 3E, the open loop response of the nominal DSA servo loop comprises the vector addition of the VCM servo loop and the microactuator servo loop. In an embodiment described in greater detail below, the scalars k1 and k2 in the equation of FIG. 3B are tuned so that the open loop response of the DSA servo loop of each individual disk drive substantially matches a target open loop response such as shown in FIG. 3E.

Figure 4:
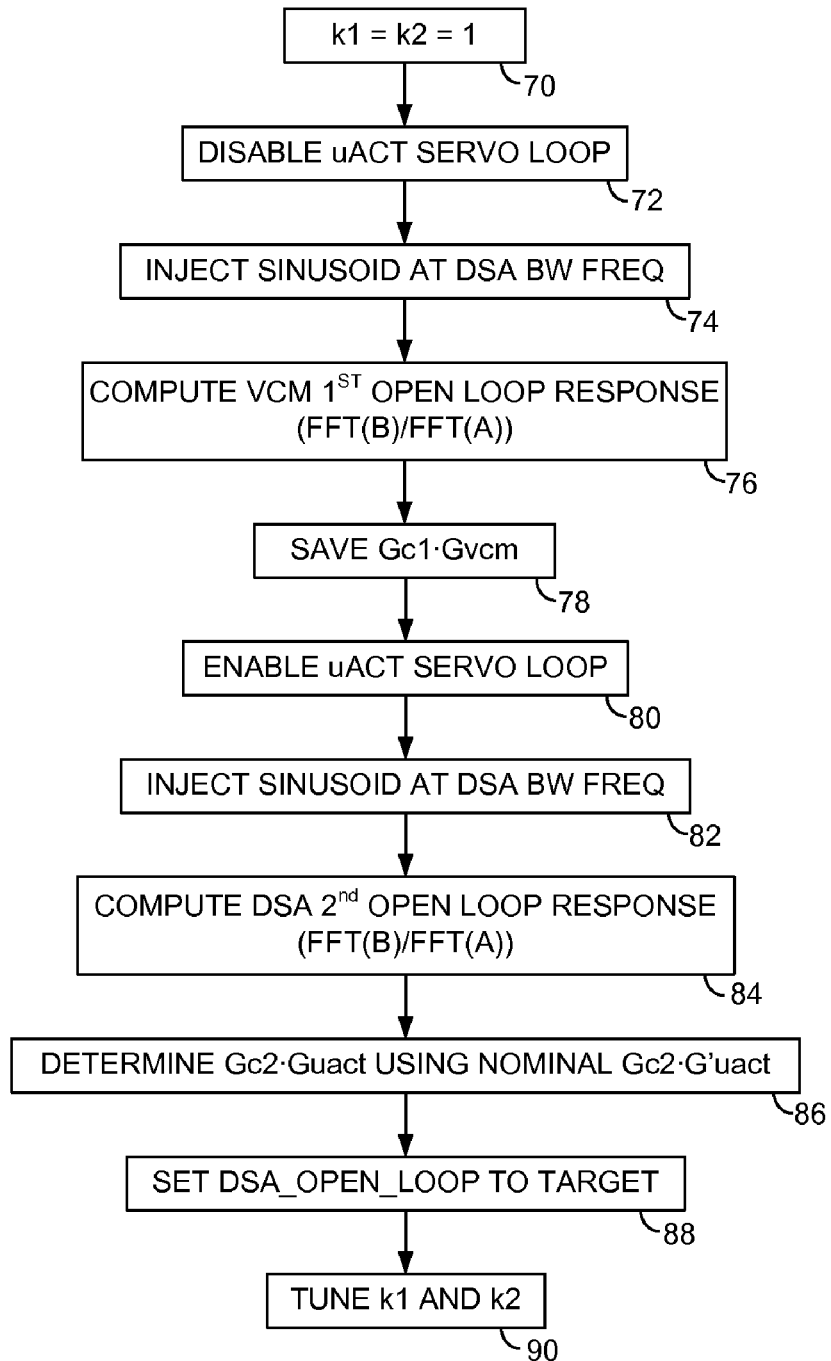
FIG. 4 is a flow diagram according to an embodiment of the present invention for determining the parameters of the equation in FIG. 3B, and for computing a microactuator servo loop gain and a VCM servo loop gain in response to the target DSA open loop response at the target frequency.

FIG. 4 is a flow diagram according to an embodiment of the present invention for tuning the scalars k1 and k2 in the equation of FIG. 3B. The scalars k1 and k2 are initialized to one (step 70), and the microactuator servo loop is disabled (step 72) conceptually illustrated in FIG. 3A as opening switch 62. A sinusoid is then injected into the VCM servo loop (step 74), wherein the sinusoid comprises a frequency substantially matching a nominal bandwidth frequency of the DSA servo loop. A first open loop response of the VCM servo loop is then computed (step 76), for example, by dividing the FFT at point B by the FFT at point A (FIG. 3A) at the frequency of the injected sinusoid. The resulting open loop response is saved as Gc1·Gvcm in the equation shown in FIG. 3B (step 78), wherein an absolute value |k1·Gc1| represents the VCM servo loop gain. The microactuator servo loop is then enabled (step 80), the sinusoid injected into the DSA servo loop (step 82), and a second open loop response of the VCM servo loop computed (step 84), for example, by dividing the FFT at point B by the FFT at point A (FIG. 3A) at the frequency of the injected sinusoid. After substituting the value Gc1·Gvcm saved at step 78 into the equation of FIG. 3B, and using a nominal value for Gc2·G'uact, a value can be determined for Gc2·Guact (step 86) as illustrated in FIG. 3C, wherein an absolute value |k2·Gc2| represents the microactuator servo loop gain. After inserting the above determined parameters of the equation shown in FIG. 3B, and setting the open loop response of the DSA servo loop to a target open loop response (step 88) such as shown in FIGS. 3D and 3E, the corresponding scalars k1 and k2 may be computed (tuned) so as to achieve the target open loop response (step 90). Any suitable technique may be employed to compute the scalars k1 and k2, such as with the well known Newton method.

In the embodiments of the present invention, the VCM servo loop gain and the microactuator servo loop gain are tuned (such as by computing the scalars k1 and k2 in FIG. 3B) to simultaneously satisfy a target gain and phase at the frequency of the injected sinusoid (e.g., a target gain and phase of a target open loop response as described above). In the embodiment of FIG. 4, the frequency of the injected sinusoid substantially matches a nominal bandwidth frequency of the DSA servo loop; however, any suitable frequency may be employed for the injected sinusoid together with the corresponding target open loop response of the DSA servo loop.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk surface;
   a head coupled to a distal end of an actuator arm;
   a dual stage actuator (DSA) servo loop comprising a voice coil motor (VCM) servo loop and a microactuator servo loop operable to actuate the head over the disk surface; and
   control circuitry operable to:
      disable the microactuator servo loop;
      after disabling the microactuator servo loop:
         inject a sinusoid into the VCM servo loop, wherein the sinusoid comprises a target frequency; and
         compute a first open loop response of the VCM servo loop;
      enable the microactuator servo loop;
      after enabling the microactuator servo loop:
         inject the sinusoid into the DSA servo loop; and
         compute a second open loop response of the DSA servo loop; and
      tune a microactuator servo loop gain and a VCM servo loop gain in response to the first and second open loop responses.

2. The disk drive as recited in claim 1, wherein the control circuitry is operable to tune the microactuator servo loop gain and the VCM servo loop gain simultaneously to satisfy a target gain and phase at the frequency of the injected sinusoid.

3. The disk drive as recited in claim 1, wherein the target frequency substantially matches a nominal bandwidth frequency of the DSA servo loop.

4. The disk drive as recited in claim 1, wherein the DSA servo loop comprises an open loop response of the form:

$$k1 \cdot k2 \cdot Gc1 \cdot Gvcm \cdot Gc2 \cdot G'uact + k1 \cdot Gc1 \cdot Gvcm + k2 \cdot Gc2 \cdot Guact$$

where:
k1 and k2 are scalars;
an absolute value |k1·Gc1| represents the VCM servo loop gain;
an absolute value |k2·Gc2| represents the microactuator servo loop gain;
G'uact represents a microactuator estimator;
Gvcm represents the VCM; and
Guact represents the microactuator.

5. The disk drive as recited in claim 4, wherein the control circuitry is further operable to determine Gc1·Gvcm at the target frequency in response to the first open loop response.

6. The disk drive as recited in claim 5, wherein the control circuitry is further operable to determine a nominal Gc2·G'uact at the target frequency.

7. The disk drive as recited in claim 6, wherein the control circuitry is further operable to determine Gc2·Guact at the target frequency in response to the second open loop response, the determined Gc1·Gvcm, and the determined Gc2·G'uact.

8. The disk drive as recited in claim 7, wherein the control circuitry is further operable to compute k1 and k2 in response to the determined Gc2·Guact, the determined Gc1·Gvcm, the determined Gc2·G'uact, and a target open loop response.

9. The disk drive as recited in claim 8, wherein the target open loop response comprises a target real part and a target imaginary part corresponding to a target magnitude and a target phase at the target frequency.

10. A method of operating a disk drive, the disk drive comprising a disk surface, a head coupled to a distal end of an actuator arm, and a dual stage actuator (DSA) servo loop comprising a voice coil motor (VCM) servo loop and a microactuator servo loop operable to actuate the head over the disk surface, the method comprising:
    disabling the microactuator servo loop;
    after disabling the microactuator servo loop:
       injecting a sinusoid into the VCM servo loop, wherein the sinusoid comprises a target frequency; and
       computing a first open loop response of the VCM servo loop;
    enabling the microactuator servo loop;
    after enabling the microactuator servo loop:
       injecting the sinusoid into the DSA servo loop; and
       computing a second open loop response of the DSA servo loop; and
    tuning a microactuator servo loop gain and a VCM servo loop gain in response to the first and second open loop responses.

11. The method as recited in claim 10, further comprising tuning the microactuator servo loop gain and the VCM servo loop gain simultaneously to satisfy a target gain and phase at the frequency of the injected sinusoid.

12. The method as recited in claim 10, wherein the target frequency substantially matches a nominal bandwidth frequency of the DSA servo loop.

13. The method as recited in claim 10, wherein the DSA servo loop comprises an open loop response of the form:

$$k1 \cdot k2 \cdot Gc1 \cdot Gvcm \cdot Gc2 \cdot G'uact + k1 \cdot Gc1 \cdot Gvcm + k2 \cdot Gc2 \cdot Guact$$

where:
k1 and k2 are scalars;
an absolute value |k1·Gc1| represents the VCM servo loop gain;
an absolute value |k2·Gc2| represents the microactuator servo loop gain;
G'uact represents a microactuator estimator;
Gvcm represents the VCM; and
Guact represents the microactuator.

14. The method as recited in claim 13, further comprising determining Gc1·Gvcm at the target frequency in response to the first open loop response.

15. The method as recited in claim 14, further comprising determining a nominal Gc2·G'uact at the target frequency.

16. The method as recited in claim 15, further comprising determining Gc2·Guact at the target frequency in response to the second open loop response, the determined Gc1·Gvcm, and the determined Gc2·G'uact.

17. The method as recited in claim 16, further comprising computing k1 and k2 in response to the determined Gc2·Guact, the determined Gc1·Gvcm, the determined Gc2·G'uact, and a target open loop response.

18. The method as recited in claim 17, wherein the target open loop response comprises a target real part and a target imaginary part corresponding to a target magnitude and a target phase at the target frequency.

* * * * *